(12) United States Patent
Noffke et al.

(10) Patent No.: US 7,627,141 B2
(45) Date of Patent: Dec. 1, 2009

(54) SYSTEM AND METHOD FOR MEASURING COLOR ON A PRINTING PRESS

(75) Inventors: Patrick James Noffke, Hartland, WI (US); Patrick Younk, Fort Collins, CO (US); Bradly S. Moersfelder, Waukesha, WI (US)

(73) Assignee: Quad/Tech, Inc., Sussex, WI (US)

( * ) Notice: Subject to any disclaimer, the term of this patent is extended or adjusted under 35 U.S.C. 154(b) by 733 days.

(21) Appl. No.: 10/424,230

(22) Filed: Apr. 25, 2003

(65) Prior Publication Data

US 2004/0213433 A1    Oct. 28, 2004

(51) Int. Cl.
G06K 9/00    (2006.01)
(52) U.S. Cl. .................... 382/112; 250/559.01; 356/303
(58) Field of Classification Search ................. 382/112, 382/141, 147, 191, 195, 210, 100, 108, 111, 382/142, 143, 144, 145, 146, 148, 149, 150, 382/181, 190, 201, 207; 250/559.01, 559.11, 250/559.04, 559.05, 559.16, 559.19; 283/91; 356/303, 394; 358/509
See application file for complete search history.

(56) References Cited

U.S. PATENT DOCUMENTS

| | | | |
|---|---|---|---|
| 5,163,012 A | 11/1992 | Wuhrl et al. | |
| 5,182,721 A | 1/1993 | Kipphan et al. | |
| 5,305,099 A * | 4/1994 | Morcos | 348/88 |
| 5,374,988 A | 12/1994 | Wertz et al. | |
| 5,384,859 A | 1/1995 | Bolza-Schunemann et al. | |
| 5,412,577 A | 5/1995 | Sainio et al. | |
| 5,432,609 A | 7/1995 | Sugiyama et al. | |
| 5,543,922 A | 8/1996 | Runyan et al. | |
| 5,689,425 A | 11/1997 | Sainio et al. | |
| 5,696,890 A | 12/1997 | Geissler et al. | |
| 5,724,259 A * | 3/1998 | Seymour et al. | 382/199 |
| 5,767,980 A | 6/1998 | Wang et al. | |

(Continued)

FOREIGN PATENT DOCUMENTS

DE    43 31 772    3/1995

(Continued)

OTHER PUBLICATIONS

Travis L. Spratlin and Marc L. Simpson, Oak Ridge National Laboratory, Color Measurements Using a Colorimeter and a CCD Camera, SPIE vol. 1670 Color Hard Copy and Graphic Arts (1992), Oak Ridge, TN.

(Continued)

Primary Examiner—Anand Bhatnagar
(74) Attorney, Agent, or Firm—Foley & Lardner LLP (57) ABSTRACT

An image processing apparatus and method for measuring spatial and spectral information from an image of a printed substrate. The image processing apparatus processes the spatial and spectral information from the same acquired image using first and second processors. In some embodiments, the image processing apparatus processes the spatial information from a first acquired image and the spectral information from a second acquired image, the first and second acquired images being of the same point on the printed substrate, acquired at separate times during the travel of the printed substrate. In other embodiments, the image processing apparatus processes the spatial and spectral information from the same acquired image using the same processor.

13 Claims, 9 Drawing Sheets

U.S. PATENT DOCUMENTS

| | | | |
|---|---|---|---|
| 5,774,225 | A | 6/1998 | Goldstein et al. |
| 5,809,894 | A | 9/1998 | Goldstein |
| 5,886,775 | A | 3/1999 | Houser et al. |
| 5,967,050 | A | 10/1999 | Seymour |
| 5,999,636 | A * | 12/1999 | Juang ................... 382/112 |
| 6,008,905 | A | 12/1999 | Breton et al. |
| 6,024,018 | A | 2/2000 | Darel et al. |
| 6,058,201 | A * | 5/2000 | Sikes et al. ............ 382/112 |
| 6,085,658 | A | 7/2000 | Goldstein |
| 6,178,254 | B1 * | 1/2001 | Rappette et al. ........ 382/112 |
| 6,373,964 | B1 | 4/2002 | Geissler et al. |
| 6,384,918 | B1 | 5/2002 | Hubble, III et al. |
| 6,583,879 | B1 | 6/2003 | Berg et al. |
| 2002/0026879 | A1 | 3/2002 | Goldstein |
| 2002/0150299 | A1 | 10/2002 | Miller |
| 2004/0042022 | A1 * | 3/2004 | Friedman et al. ......... 358/1.9 |

FOREIGN PATENT DOCUMENTS

| | | |
|---|---|---|
| DE | 4331772 | 3/1995 |
| EP | 0508257 | 10/1992 |
| EP | 1197331 | 4/2002 |
| GB | 2271080 | 4/1994 |
| JP | 61112931 | 5/1986 |
| JP | 61112931 | 10/1986 |
| WO | WO 9531333 | 11/1995 |
| WO | WO 0250518 | 6/2002 |

OTHER PUBLICATIONS

Printed website pages from http://www.specim.fi/print-products-imspector.html, printed Jun. 30, 2004, U.S.A.

Printed website pages from http://www.specim.fi/print-products-spectralimagingsystems.html, printed Jun. 30, 2004, U.S.A.

VTT Technical Research Centre of Finland, Hyperspectral prism-grating-prism imaging spectrograph, 2001.

Communication from European Patent Office for Application No. 04 252 096.5 —2217, Ref. DE/P04720PEP, dated Apr. 29, 2008, 6 pages.

European Search Report for Application No. 04 252 096.5, dated Sep. 23, 2005, 17 pages.

Amendment and Reply for U.S. Appl. No. 10/790,451, filed Feb. 17, 2004, filed with U.S. Patent and Trademark Office Apr. 10, 2008, 11 pages.

U.S. Appl. No 10/790,451, filed Feb. 17, 2004, Noffke et al.

* cited by examiner

SYSTEM AND METHOD FOR MEASURING COLOR ON A PRINTING PRESS

FIELD OF THE INVENTION

The present invention relates to an apparatus and method for measuring spectral and spatial information on a printing press.

BACKGROUND OF THE INVENTION

In the printing industry, a desired image is repeatedly printed on a continuous web or substrate such as paper. In a typical printing process, the continuous web is slit in the longitudinal direction (the direction of web movement) to produce a plurality of continuous ribbons. The ribbons are aligned one on top of the other, folded longitudinally, and then cut laterally to produce a plurality of multi-page, approximately page-length segments, each of which is termed a "signature". The term signature also encompasses a single printed sheet that has or has not been folded.

To monitor the print quality on a signature, various methods may be used to measure the color quality of the printed signature. One method includes printing a color bar having multiple color patches of different known colors and intensities such that the color quality of the color bar can be measured and compared to a standard, the color bar being representative of the color quality of the printed signature. By so doing, the color quality of the printed signature may be measured by utilizing an image processing apparatus, e.g. a camera, to acquire an image of a single point of the printed color bar. Current image processing apparatus systems for measuring the color quality may utilize a CCD color camera having red, green, and blue channels (i.e. an RGB camera).

There may be a difficulty with current image processing systems, especially with those utilizing an RGB camera, in developing color transforms to transform from the RGB filters to the density or colorimetry filters. This may limit the number of ink colors than can be effectively monitored using the image processing system.

SUMMARY OF THE INVENTION

The present invention provides an image processing apparatus for use with a printed substrate. The image processing apparatus includes a first processor that receives an acquired image from the printed substrate and processes the spatial information from the acquired image. The image processing apparatus also includes a second processor that receives the same acquired image and processes the spectral information from the acquired image.

In one embodiment of the invention, the image processing apparatus further includes a beamsplitter to separate the acquired image into multiple beams. In another embodiment of the invention, the first and second processors generate first and second signals, respectively. In another embodiment of the invention, the image processing apparatus further includes a third processor that analyzes the first and second signals to correct for the effects of scattered light. In another embodiment of the invention, the first processor is a spatial imaging device. In another embodiment of the invention, the second processor is a spectral imaging device. In another embodiment, the image processing apparatus also includes one of a diffraction grating or a prism. In another embodiment, the image processing apparatus further includes a first lens, a light blocker having a slit therein, a second lens, a cutoff filter, and a third lens.

The invention includes a method of monitoring the color of a printed substrate. The method includes acquiring an image from the printed substrate and thereafter processing spatial and spectral information generated from the acquired image.

In one embodiment, acquiring the image includes acquiring a plurality of color portions within the image. In another embodiment, the spatial information generated is processed using a first processor and the spectral information generated is processed using a second processor.

In another aspect, the present invention provides an image processing apparatus for use with a printed substrate, the image processing apparatus including a processor that receives an acquired image from the substrate. The processor is adapted to process the spectral information from the acquired image. The image processing apparatus also includes a weighted transform applied to the processor to allow the processor to process the spatial information from the acquired image.

In another aspect, the present invention provides an image processing apparatus for use with a printed substrate, the image processing apparatus including a first processor that receives a first acquired image from the printed substrate. The first acquired image is acquired from information from multiple color portions on the printed substrate. The image processing apparatus also includes a second processor that receives a second acquired image from the printed substrate. The second acquired image is acquired from information from multiple color portions on the printed substrate. The image processing apparatus also includes a communication link between the first and second processors such that the spatial information from the first processor directs the second processor to acquire the second image.

Other features and advantages of the invention will become apparent to those skilled in the art upon review of the following detailed description, drawings, and claims.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
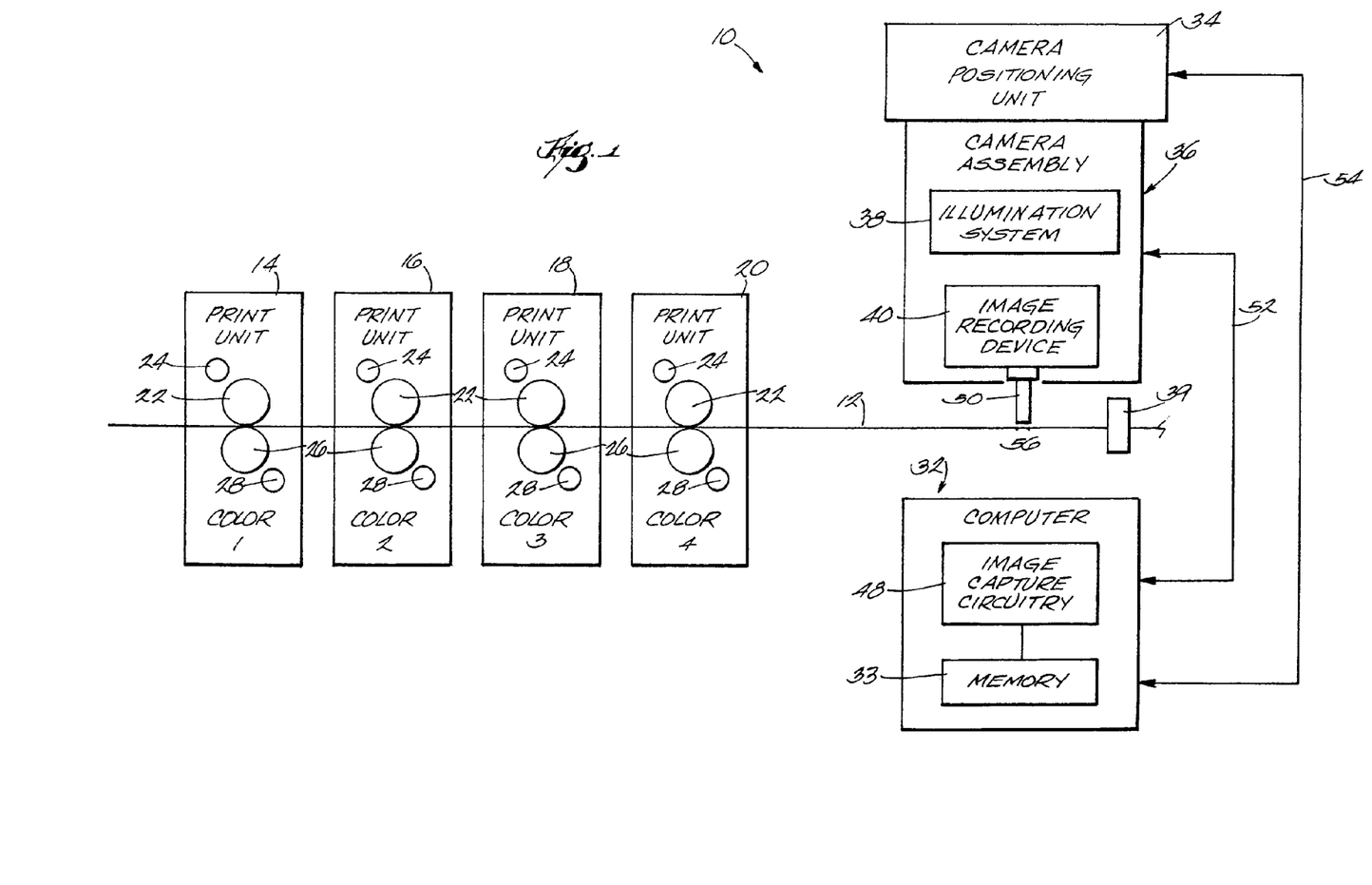
FIG. 1 is a block diagram of a printing system in accordance with the present invention.

Referring to FIG. 1, a printing system 10 for printing a multi-color image upon a web 12 is illustrated. In the illustrated embodiment, four printing units 14, 16, 18, and 20 each print one color of the image upon the web 12. This type of printing is commonly referred to as web offset printing. Each print unit 14, 16, 18, 20 includes an upper blanket cylinder 22, an upper printing plate cylinder 24, a lower blanket cylinder 26, and a lower printing plate cylinder 28. In the printing system 10, colors 1, 2, 3, and 4 on units 14, 16, 18, and 20 respectively, are black (K), cyan (C), magenta (M), and yellow (Y). However, it is understood that any colors of ink may be effectively analyzed by the present invention. The location of the printing units 14, 16, 18, and 20 relative to each other is determined by the printer, and may vary.

In the illustrated embodiment, the printing press is a web offset press. It is contemplated, however, that the present invention be applicable to other types of printing presses, such as rotogravure, flexographic, and sheet-fed presses. The present invention may also be used for other applications, such as for use in the packaging industry.

The system 10 includes an image processing apparatus 36 in optical communication with the web 12. The image processing apparatus 36 includes an illumination system 38 and an image recording device 40. The specific configuration of the image processing apparatus 36 will be described in more detail below. The printing system 10 includes a positioning unit 34, a computer 32, and a web stabilizer 39.

It is known in the printing industry to print one or more color bars along an edge portion of the web 12. Color bars typically include multiple patches of different colors (K, C, M, and Y in the present embodiment), intensities, and halftone values (such as 25% patches, 50% patches, and 75% patches). The image processing apparatus 36 captures an image of these color bars to monitor the color quality of the web 12. However, it is understood that in some applications, the color bars may not be necessary as measurements can be taken from any region within the printed region. The information obtained from the color bars or from any other position on the web will be described in more detail below.

In general operation, the positioning unit 34 moves the image processing apparatus 36 to a first position on the web 12. A printed image is illuminated by the illumination system 38 and the image recording device 40 records an image signal which is representative of a portion of the printed substrate within the field of view 56. The illumination system 38 is synchronized with the movement of the web 12 such that the recorded image signal includes a portion of the color bars.

The computer 32 may be of the conventional type such as including a Pentium microprocessor and PC architecture. The computer 32 includes random access memory 33 (semiconductor memory and/or disk drive storage) and image capture circuitry 48 which interfaces with the image processing apparatus 36. In other embodiments, the computer 32 may be a microprocessor housed within the image processing apparatus 36.

Figure 2:
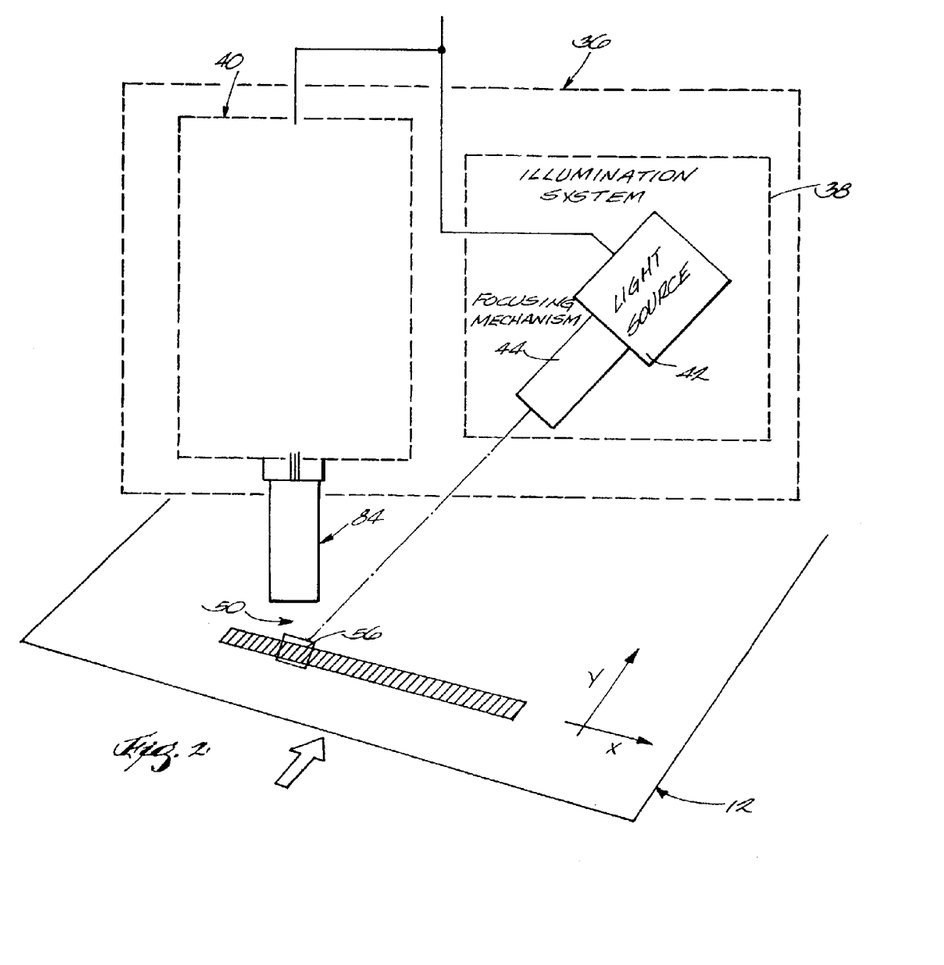
FIG. 2 illustrates an image processing apparatus assembly and a printed image within the field of view.

The computer 32 is connected to the positioning unit 34 by a communication link 54, and the computer 32 sends control signals to the positioning unit 34. The positioning unit 34 is mechanically coupled to the image processing apparatus 36 and moves the image processing apparatus 36 in a direction perpendicular to the web motion, termed the lateral direction (X-axis, see FIG. 2). Moving the image processing apparatus 36 across the web 12 allows selective image recording of lateral portions of the printed image on the web 12. The image processing apparatus 36 records the printed image within the field of view 56 for various positions of the image processing apparatus 36 across the web 12. The web 12 is moving in the Y direction so that circumferential or Y-axis positioning by the positioning unit 34 is not necessary because the timing of the strobe light in the illumination system 38 effectively provides circumferential positioning relative to the moving web 12, as is further explained below.

It is also contemplated that a positioning unit not be utilized, if, for example, a plurality of image processing apparatus are combined to obtain a field of view that covers all required areas of the web 12, or if only one area of the web 12 is to be monitored.

Stabilization may be necessary to reduce the web motion toward and away from the image processing apparatus 36. This motion is termed web flutter. Web flutter will cause the image to sometimes be out of focus and will cause the magnification of the image to change. The stabilizer 39 can be any mechanism that dampens the flutter of web 12 to within acceptable limits of depth-of-field for recording the printed image on the web 12 by the image processing apparatus 36, without causing the ink to smear. The web stabilizer 39 may be a non-invasive web stabilizer such as that disclosed in U.S. Pat. No. 4,913,049 entitled "Bernoulli Effect Web Stabilizer." A non-invasive stabilizer is one that does not make physical contact with the web 12.

Reduction of rippling or corrugations in the web may also be necessary. Any ripples in the web 12 can cause light and dark spots in the image obtained from the web 12. These light and dark spots do not usually affect the determination of the location of the color bar (or whatever other area of the web that you are imaging), but they can adversely affect the color measurements of the image. One way to reduce these ripples in the web is to run the web 12 over an idler, giving more support to the web 12.

If the web 12 is transparent or translucent, accurate optical density measurements will require that light reflected back through the web 12 be minimized. This can be accomplished by providing a black backing behind the web 12, providing a large open cavity behind the web 12 such that little light will be reflected through the web 12, or utilizing a black roller if the web 12 is stabilized by imaging on a roller.

The image processing apparatus 36 and positioning unit 34 may be mounted on the press anywhere after the ink has been applied to the web 12. For example, they may be mounted between the last print unit and the oven, directly after the oven, on the chill rolls, or after the chill rolls. If optical density measurements are required in the absence of other inks, or if the measurement is required immediately subsequent to printing, it may be advantageous to mount the image processing apparatus 36 and the positioning unit 34 between print units.

The illumination system 38 is coupled to the computer 32 by a signal bus 52. The illumination system 38 includes a light source 42 (only one shown) and a focusing mechanism 44. Control signals from the computer 32, corresponding to when a color bar is within the field of view 56, are sent via the signal bus 52 to indicate when the web 12 should be illuminated by the light source 42. The light source 42 in the illustrated embodiment is a xenon strobe, however other types of light sources can also be used. For example, for applications with slower web speed, halogen bulbs provide appropriate lighting.

In one embodiment, pulsed xenon strobe lights with a pulse duration of approximately one microsecond are utilized. With a web speed of 3500 feet per minute and if we want the color bar (or sampled region) to move less than 0.003" during the illumination period, a five microsecond illumination time is preferred to minimize the amount of movement of the printed image during the time the image recording device 40 is quantifying the amount of incoming light reflected from the web 12. By way of example, the light source 42 may include a strobe light assembly utilizing strobes FX-1163 with coordinated 1100 series power supplies, available from Perkin-Elmer.

The illumination control signals from the computer 32 are produced, for example, by conventional means utilizing rotational position information generated from a sensor placed on one of the blanket cylinders (22 or 26), knowledge of the speed of the web 12, and knowledge of the distance between the image recording device 40 and the blanket cylinder (22 or 26).

The focusing mechanism 44 efficiently concentrates the light emitted from the light source 42 onto the image within the field of view 56. When the strobe light is flashed, the image recording device 40 records the image within the field of view 56, which contains portions of the color bars. In some embodiments, to reduce the effects of scattered light, the lighting could be modified such that only the color bar is illuminated when measuring the spectra. In this embodiment, a larger area of the printed substrate would be illuminated while searching for a color bar and once the color bar is found, the lighting would be reduced to illuminate only the color bar and the area just adjacent to the color bar.

Figure 3:
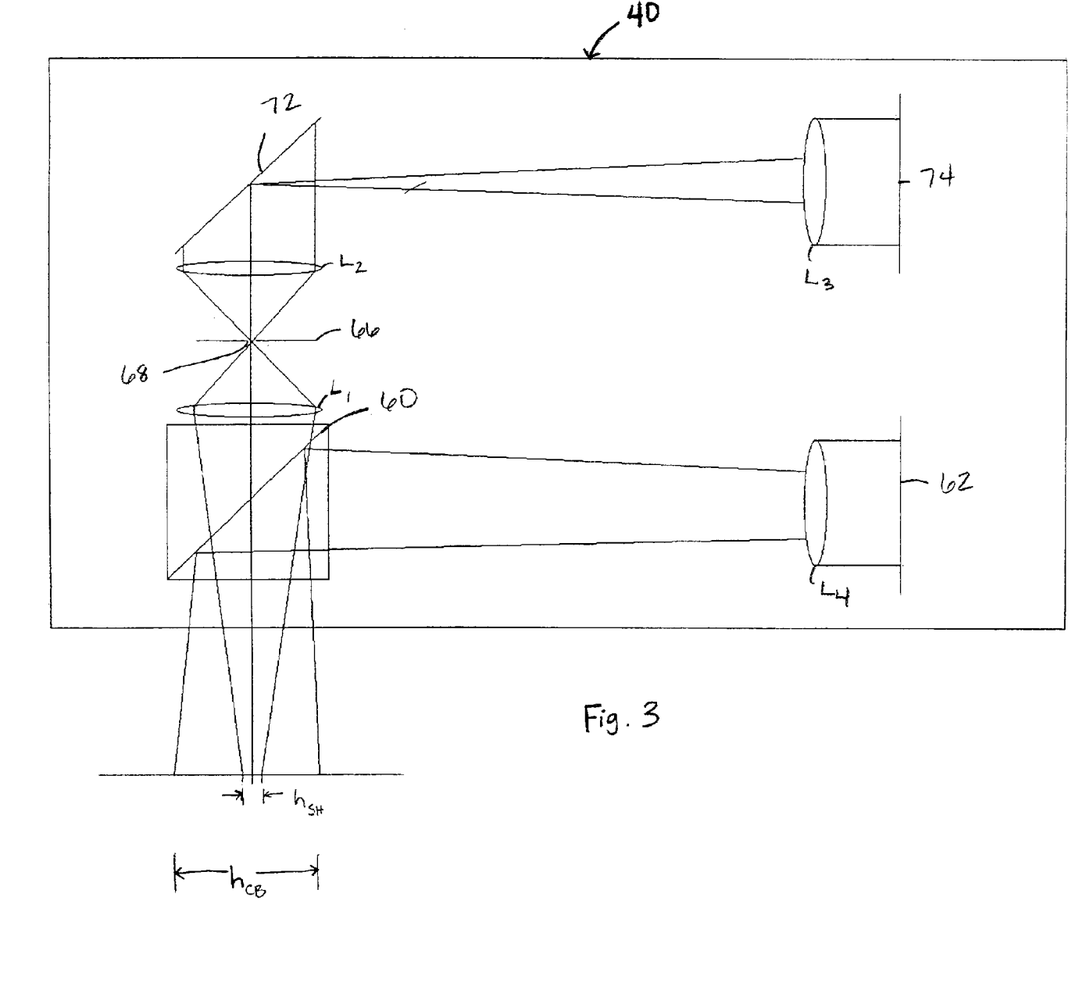
FIG. 3 is a schematic diagram of an image processing apparatus assembly according to one embodiment of the present invention.

Turning now to FIG. 3, the image processing apparatus 36 of one embodiment of the present invention is shown. Light is reflected off of the web 12 into the image processing apparatus 36 and is received by a beamsplitter 60. This reflected light is the image acquired by the image processing apparatus 36. Beamsplitters of various reflection and transmission percentages can be used based on the overall efficiency of each path of optics. For example, if the spectral portion is less efficient than the spatial portion, a beamsplitter having a 30% reflectance and 70% transmittance may be used, where the transmitted portion of the beam progresses along the spectral path.

Figure 5:
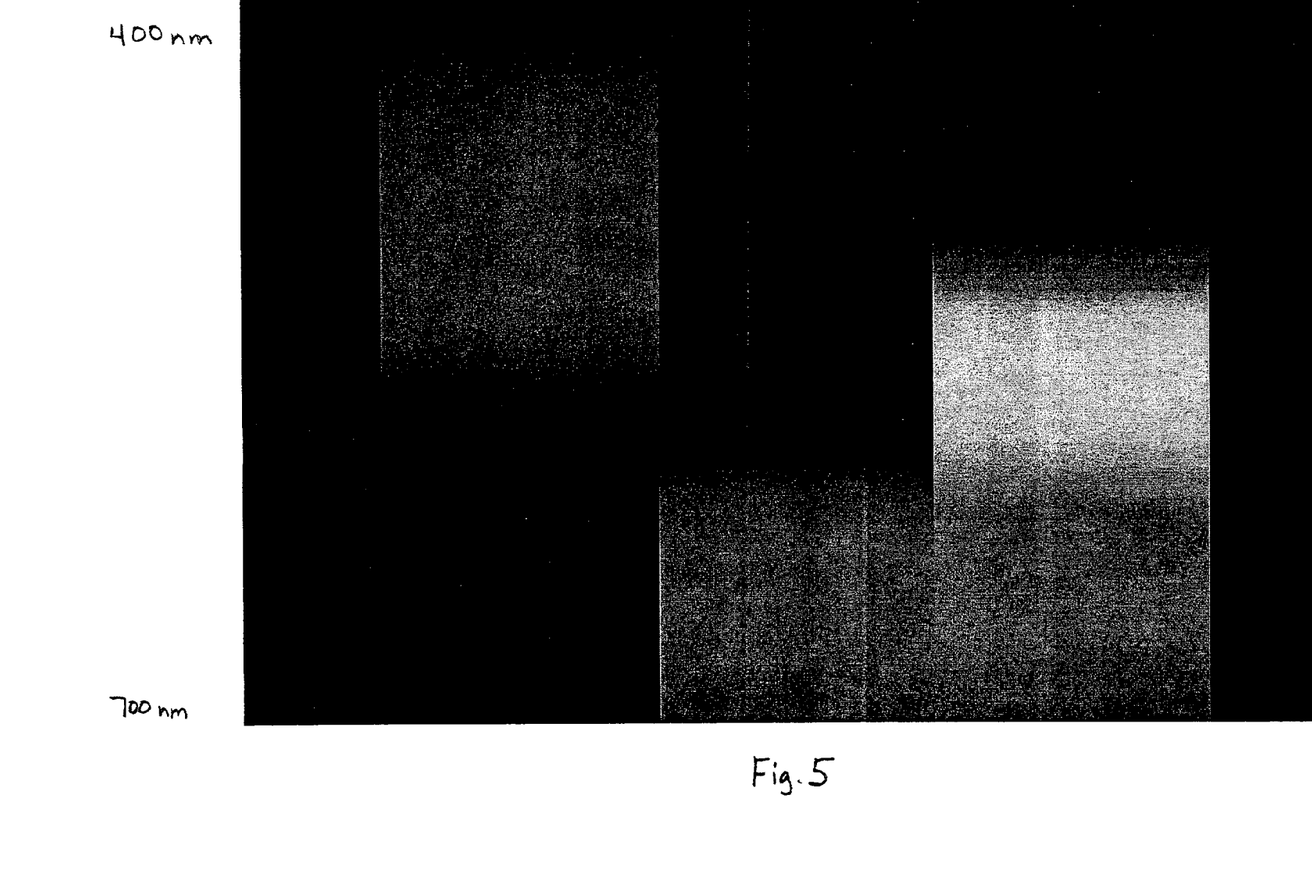
FIG. 5 illustrates the image generated by the image processing apparatus of the present invention, taken through the color bar patches of a printed substrate.

The acquired image represents a thin slice through multiple patches along a color bar, as illustrated in FIG. 5. As illustrated in FIG. 3, a portion (i.e. a beam) of the acquired image is diverted by the beamsplitter 60 to a first processor. In the illustrated embodiment, the first processor is a spatial imaging device 62. The spatial imaging device 62 processes the spatial information from the acquired image. The spatial information conveys where on the web 12 the data is coming from.

Another portion of the same acquired image passes through the beamsplitter 60 to the focusing lens $L_1$. From the lens $L_1$, the image travels to the light blocker 66 having a slit 68 therein. The light blocker 66 may be made of any material that prevents light from passing therethrough. In the illustrated embodiment, the light blocker 66 is made of aluminum having a thickness of approximately ten microns. The light blocker 66 may be darkened or black anodized to reduce the incidence of reflected light off of the light blocker 66. The slit height and magnification of lens $L_1$ are chosen such that in the vertical direction (the short dimension of a color bar), approximately one-half of the image of the color bar is transmitted through the slit 68. The light blocker 66 allows circumferential movement (i.e. how much the image "moves" from sample to sample) of ±¼ of the color bar height. The length of the slit 68 is chosen such that several color bar patches (for example, ten) go through the slit 68. The size of the slit 68 assures that only light from the reflected color bar passes through the slit 68, even if the image is not centered on the slit 68. The lens $L_1$ focuses the acquired image onto the slit 68.

From the slit 68, light travels to a collimating lens $L_2$. The lens $L_2$ transmits light as a parallel beam to a ruled diffraction grating 72. It is understood that a transmission-type diffraction grating could also be used. It is also understood that a prism 86 may be used instead of a diffraction grating as the dispersing element. A system utilizing a prism is described in more detail below with respect to FIG. 9. The diffraction grating 72 disperses light into its spectral components along a known angular spread.

Gratings are designed to have higher efficiencies at particular frequencies, but have non-zero efficiency over a very wide range. For example, part number F43-742 from Edmund Optics has 600 lines/mm and is optimized to have maximum efficiency at 500 nm. However, this grating has significant efficiency from about 300 nm to 1200 nm. Light of multiple frequencies can also be diffracted at the same angle. For example, light at 800 nm is first-order diffracted at the same angle as the second-order diffraction of 400 nm, and the third order diffraction of 267 nm. If overlapping spectra are not desired, cutoff filters 71 that block light of the wavelengths not of interest should be inserted in the optical path before the diffraction grating. In the illustrated embodiment, we are interested in light between about 400 nm and about 700 nm such that cutoff filters 71 (shown in shadow in FIG. 4) would be inserted before the diffraction grating 72 to block all light above 700 nm and below 400 nm.

In the illustrated embodiment, the angular spread of light between about 400 nm and 700 nm is approximately 12°. This dispersion occurs in the vertical dimension (with reference to FIG. 5). A focusing lens $L_3$ focuses the dispersed light onto a second processor, where it is captured. In the illustrated embodiment, the second processor is a spectral imaging device 74. The spectral processing device 74 processes the spectral information from the acquired image.

Figure 4:
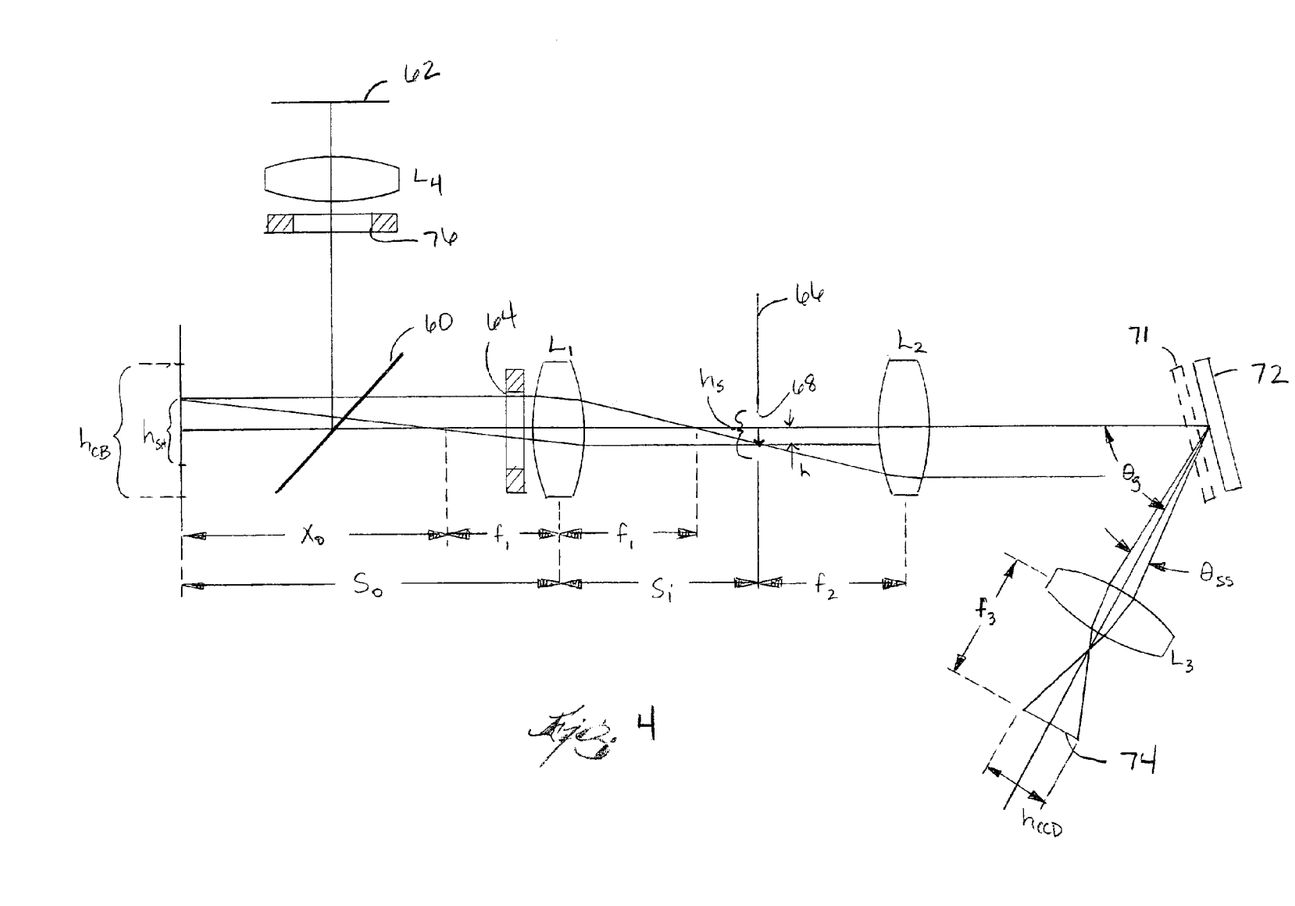
FIG. 4 is a more detailed schematic of the diagram of FIG. 3.

FIG. 4 illustrates in more detail the optics of the image processing apparatus 36 described above with respect to FIG. 3. As illustrated, the portion of the beam transmitted through the beamsplitter 60 to the spatial components travels through an aperture 76 (to help limit the amount of incidental light and to help control the amount of aberrations) and through a lens $L_4$ onto the spatial imaging device 62. The magnification of the spatial components should be such that the light fits across the spatial imaging device 62. The lens $L_4$ should be placed such that the spatial imaging device 62 is at the focal length $f_4$ of lens $L_4$.

To determine the proper optical placement of the spectral components (i.e. the proper focal lengths of the lenses, as well as the proper position of the slit) within the imaging processing apparatus to get the spectral spread to fit across the spectral processing device 74, it is preferred to begin at the end (i.e. the spectral processing device 74) and work back to the color bar. First, the focal length $f_3$ of the lens $L_3$ is determined. This is dependent on the amount of spectral spread $\theta_{ss}$ off of the diffraction grating 72. If the spectral processing device 74 has a height $h_{CCD}$, then $\tan(\theta_{ss}/2) = h_{CCD}/2f_3$. Thus, in order for the spectra to fit on the spectral CCD, $f_3 \leq h_{CCD}/[2\tan(\theta_{ss}/2)]$.

The spectral spread $\theta_{ss}$ is determined by the line spacing of the diffraction grating 72, and the wavelengths of the light of interest. In the illustrated embodiment, a diffraction grating 72 having 600 lines/mm is used. The grating equation is $m\lambda = d(\sin\theta_m - \sin\theta_i)$, where m=the diffraction order, d=the groove spacing of the grating, $\theta_m$=the diffraction angle for order m, and $\theta_i$=the incident angle of the light (e.g. the blaze angle, which is 8.6° in the illustrated embodiment).

For a blazed diffraction grating with blaze angle $\theta_b$, the diffracted light efficiency is maximized when $\theta_i = \theta_b$. If wavelengths from $\lambda_1=400$ nm to $\lambda_2=700$ nm are of interest (which approximately covers the range of visible light), and $d=\frac{1}{600}$ lines/mm=1667 nm, then for the first order diffraction (which is the preferred order because it has the highest strength of reflected light):

400 nm=1667 nm (sin $\theta_{m1}$−sin(8.6°))

$\theta_{m1}=22.9°$ and 700 nm=1667 nm (sin $\theta_{m2}$−sin(8.6°))

$\theta_{m2}=34.7°$.

Thus, the spectral spread is $\theta_{ss}=34.7°−22.9°$ $\theta_{ss}=11.8°$.

The spectral processor 74 is placed a distance from the lens $L_3$ equal to the focal length $f_3$. In the spatial dimension, the diffraction grating 72 acts as a mirror.

If the slit height is $h_s=0.1$ mm, and 10 nm spectral resolution (or 36 bins) is desired, this equates to the zero-order slit width on the spectral processor 74 having a height of $h_{CCD}/36$. Calculating spectral resolution based on the zero-order slit width is an approximation, since the light through the slit has a non-uniform profile. Thus, the lens $L_3$ and the lens $L_2$ need a combined magnification of $|M_{23}| \leq h_{CCD}/[(0.1 \text{ mm})(36)]$. $|M_{23}|=f_3/f_2$, where $f_2$ is the focal length of the lens $L_2$. Thus, $f_3/f_2 < h_{CCD}/3.6$ mm and $f_2 \geq 3.6 f_3/h_{CCD}$.

If the sampled height of the color bar $h_{sh}$ is to be magnified to the slit height $h_s$, the slit is placed at the image position $s_i$ of the lens $L_1$ (to focus the image on the slit) and at a distance equal to the focal length $f_2$ of the lens $L_2$ (to collimate the light). If $h_{sh}=0.8$ mm (or approximately $\frac{1}{32}$ inch), and $h_s=0.1$ mm, then the lens $L_1$ must magnify by $|M_1|=0.125$. But, we also need the spatial dimension to fit across the spatial processing device 62.

Plugging in some values, let $h_{CCD}=4.36$ mm. Then $f_3 \leq 4.36$ mm/[2 tan (11.8°/2)]

$f_3 \leq 18.0$ mm.

So, let $f_3=14$ mm. Then, $f_2 \geq (3.6 \text{ mm})(14 \text{ mm})/4.36$ mm $f_2 \geq 11.6$ mm.

If 25 mm is to spatially fit across the spatial processor 62, the overall magnification $|M_{123}|$ must be $|M_{123}|=4.36$ mm/25 mm $|M_{123}|=0.174$.

If $|M_1|=0.125$, then we need $|M_{23}| \leq 1.39$ $f_3/f_2 \leq 1.39$ $f_2 \geq (14 \text{ mm})/(1.39)$ and $f_2 \geq 10.1$ mm.

The above calculations represent two constraints on the focal length $f_2$ such that a focal length should be chosen that satisfies both constraints. So, let $f_2=12.0$ mm.

The image height $h_i$ (i.e. the slit width) at the focal point of the lens $L_2$ determines the spectral resolution in the image processing apparatus. If 36 bins of spectral resolution are desired, then the light incident on the diffraction grating needs to be within $\theta_{ss}/36$ or $13°/36=0.361°$. This is not a perfect formula since the light through the slit has a non-uniform profile.

Finally, to calculate the focal length $f_1$ of the lens $L_1$, if $|M_1|=f_1/x_o=0.125$ (where $x_o$ is a variable that equals the distance from the object to the focal point of the lens $L_1$)

and $x_o=100$ mm then $f_1=12.5$ mm.

So we have $f_1=12.5$ mm $f_2=12.0$ mm $f_3=14.0$ mm.

As described, the image recording device 40 of the present invention includes both the spatial imaging device 62 and the spectral imaging device 74. The image processing apparatus 36 as illustrated processes both the spatial and spectral information from the same acquired image (i.e. acquired from the same position on the web at the same time). The spatial and spectral images, taken together, allow the press operators to analyze the print quality of the image and make adjustments, where necessary. This system allows for improved color control of the printed web 12 in that the image processing apparatus 36 can measure the spectral response of color bar patches within a color bar with very fine spectral resolution. This makes it easier to match the densitometric and colorimetric filters for measuring color to the image processing apparatus 36.

FIG. 5 illustrates the spectral and spatial information generated using the image processing apparatus 36 of the present invention. As illustrated, the spatial information is measured along the horizontal axis and the spectral information along the vertical axis. Using this information, the print quality of the printed substrate can be monitored and adjusted as necessary. Light having a wavelength of approximately 400 nm is located near the top of the image and light of approximately 700 nm is located near the bottom of the image.

Figure 6:
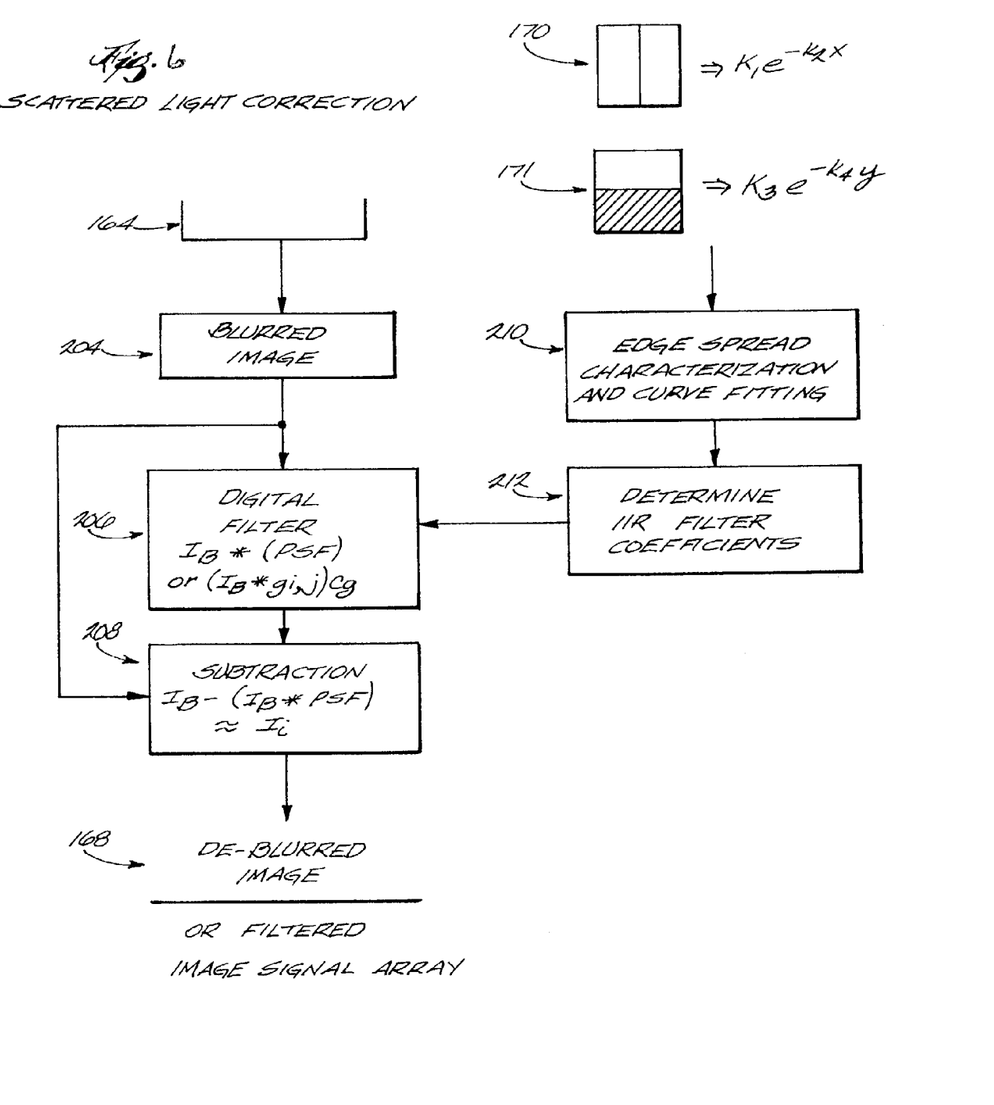
FIG. 6 is a flow chart of a scattered light correction.

Scattered light is an issue in systems for measuring color quality because scattered light affects the accuracy of the color measurement of the printed substrate. One solution to scattered light problems in systems for measuring color is described in U.S. Pat. No. 5,724,259, the entire contents of which is incorporated herein by reference. FIG. 6 illustrates a flow chart of this scattered light correction. Another solution to the scattered light issue is to adjust the optics and/or illumination of the web to reduce the effects of scattered light.

Figure 7:
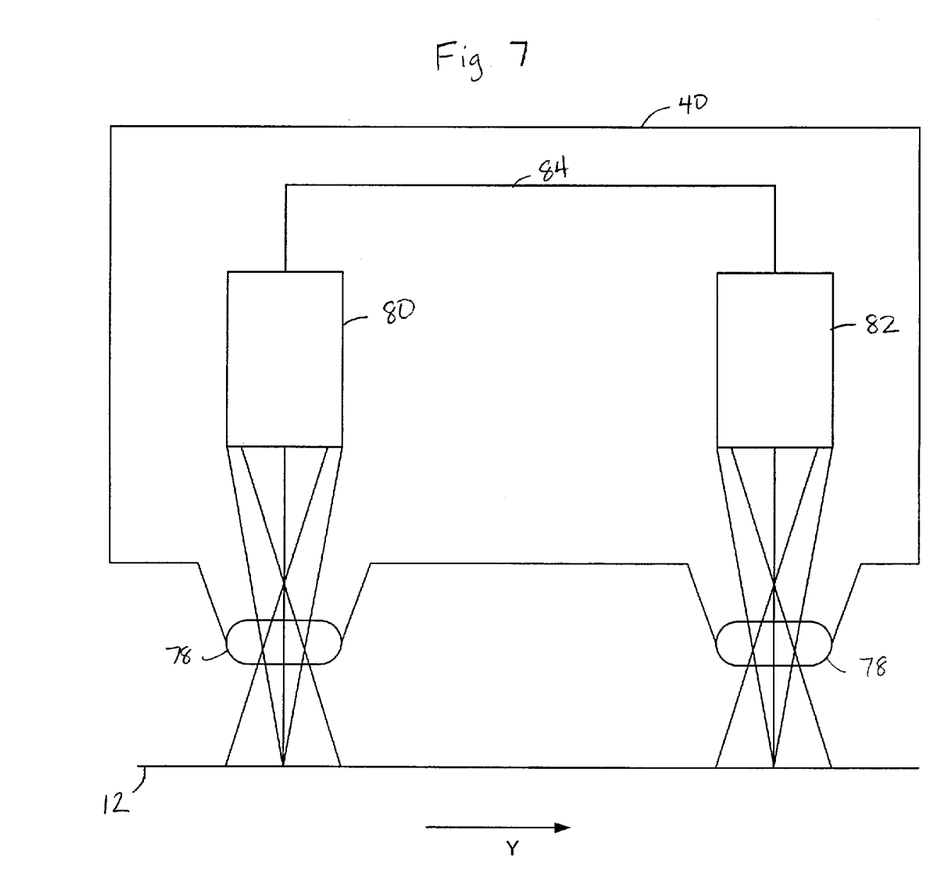
FIG. 7 is a schematic diagram of the optics of another embodiment of the image processing apparatus.
Figure 8:
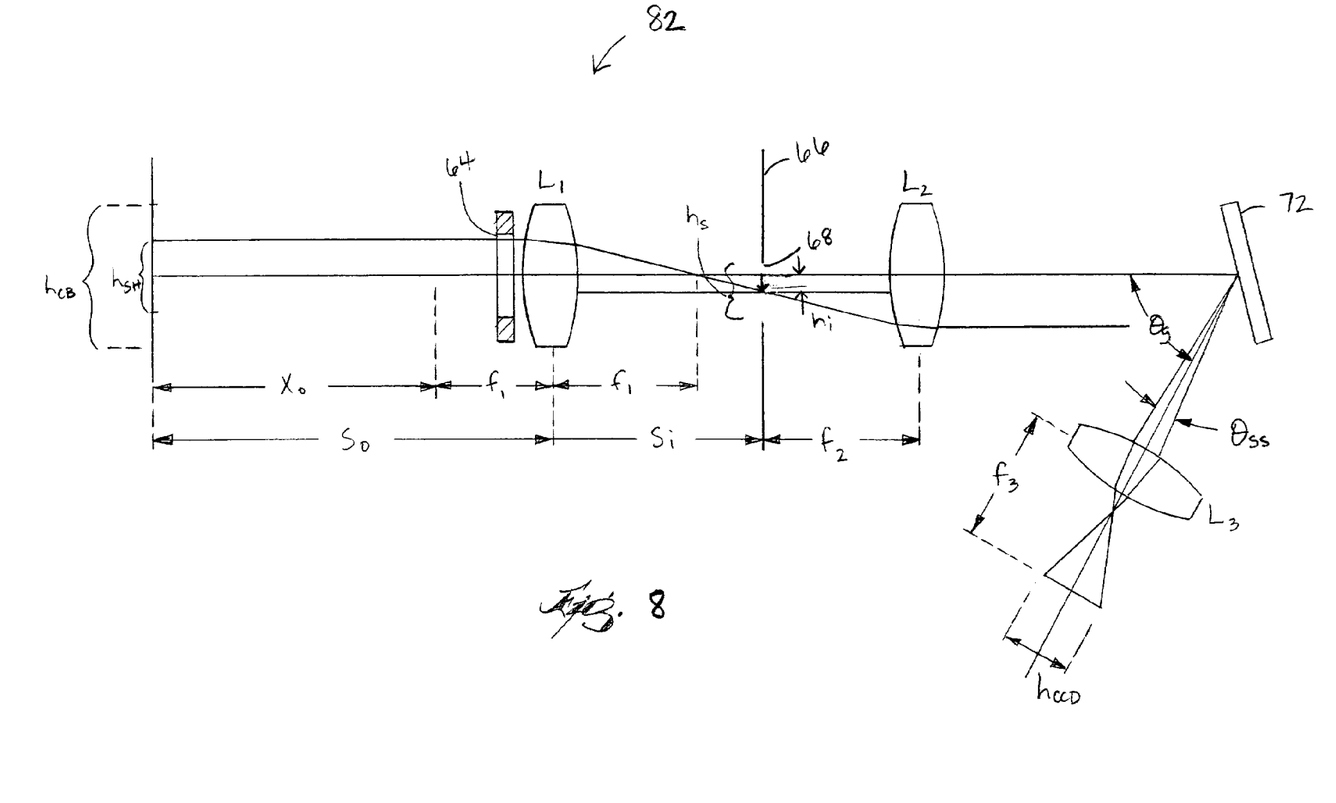
FIG. 8 is a more detailed schematic of the diagram of FIG. 7.

FIGS. 7 and 8 illustrate an alternative embodiment of the present invention utilizing separate spectral and spatial processors that process separate acquired images. In this embodiment, both processors are sampling a line around two inches long. With reference to FIG. 7, the spatial components 80 include a single channel CCD positioned upstream from the spectral components 82. The spatial components 80 measure the position on the web 12 being measured to time the illumination of the web, and thus the acquisition of the image, by the spectral components 82 to ensure that the spectral components are acquiring an image of the desired region of the web. The spatial components 80 and spectral components 82 are connected by signal bus 84 such that the spatial components 80 send a signal to the spectral components 82 signaling the spectral components 82 when to acquire an image from the printed substrate moving below the image processing apparatus 36. Utilizing the separate spatial and spectral images allows for the illumination of a very thin line across the color bar (or other region within the work), reducing any issues caused by scattered light. Further, the scattered light that does remain is more easily correctable. A continuous light source is used to illuminate the web for the spatial sensor, while a strobe should be used to illuminate the web for the spectral sensor.

In one embodiment, the spatial components include a line-scan CCD that can continuously sample a line across the web in the lateral direction. In this design, the spatial resolution of the spatial processor is of interest. Circumferentially, this can be determined by the maximum line rate of the processor and the maximum press speed. For example, with a press moving at 3000 ft/min, and if we want 0.0125" per pixel circumferentially, we need a line rate of 48 kHz. With 0.0125" resolution (or 80 dpi), and the smallest color bar height being 1/16", this provides for five pixels circumferentially, which should be sufficient to locate the color bar. Laterally, the resolution is determined by the optics, the processor size, and the number of pixels. If we want to span two inches laterally, and the sensor has 128 pixels, we have a lateral resolution of 0.0156", or 64 dpi. With a color bar patch width of 0.1", this provides for 6.4 pixels per color bar patch, which should be sufficient.

FIG. 8 illustrates the details of the optics design for the spectral processor. The spectral optics are similar to those described above with respect to FIGS. 3 and 4, minus the beamsplitter, and thus will not be separately discussed.

Figure 9:
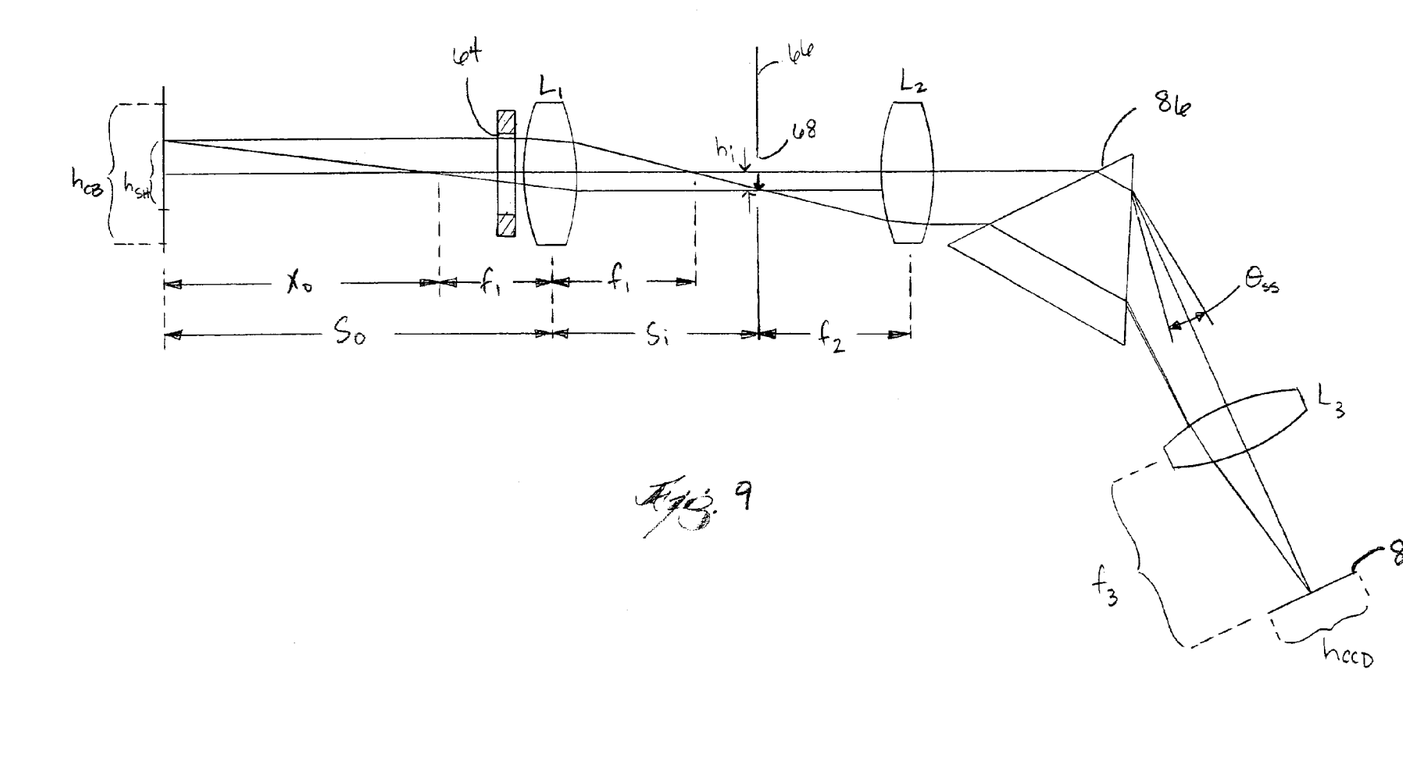
FIG. 9 is a schematic diagram of the optics of another embodiment of the image processing apparatus.

FIG. 9 illustrates an alternative embodiment of the present invention. A prism 86 is used to disperse the light in place of a diffraction grating, though it is understood that a diffraction grating could be used here in the same way as described above for FIG. 4. As mentioned above, a prism may also replace the diffraction grating in the embodiments of FIG. 4 or 8. Depending on which dispersing element is used in the system, be it a prism, diffraction grating, or other dispersing element, there are different formulas to calculate the angular spread $\theta_{ss}$, all of which are known in the art. Utilizing a prism 86 results in an angular spread $\theta_{ss}$ about one half as large as the angular spread $\theta_{ss}$ described above for FIG. 4. Using a prism 86 results in a dispersion vs. wavelength that is highly non-linear (the prism 86 spreads the red wavelengths more and compresses the blue wavelengths, resulting in lower resolution) and can be corrected for. If the non-linearity of the prism is such that the blue wavelengths are compressed too much to obtain the desired spectral resolution, a smaller slit or a thinner line of illumination can be used. Using a prism as a dispersion element does not result in the overlapping spectra described above with respect to the diffraction grating of FIG. 4. Thus, no filters are required before the prism to block out unwanted light.

As illustrated in FIG. 9, a single spectral sensor 88 is used to monitor color quality. A thin line of the web 12 is continuously illuminated. The single sensor 88 measures the spectra of the web continuously. The spectral sensor 88 can be utilized to build the spatial image by applying a weighted transform that functionally converts the sensor to a monochrome sensor. The weighted transform is a mathematical processing of the signal generated by the spectral sensor 88. The application of the weighted transform allows the single sensor 88 to also extract the spatial information.

This embodiment could be used to control the color of the printed web without utilizing a color bar as the sensor measures multiple lines across the printed web 12 continuously, known in the art as markless color control. The circumferential spatial resolution of the image processing apparatus 36 is then only limited by the speed at which the spectral sensor 88 can scan the web, and by the maximum press speed. The spectral resolution, however, is independent of the press speed and sensor 88 speed. The sensor 88 could be a line scan CCD that can continuously scan the web. The spectral optics of the sensor 88 may not require a slit when the line scan CCD is used to achieve the desired spectral resolution because only a thin line of the web is illuminated. However, a slit may still be used and may be desirable to ensure that the desired spectral resolution is accomplished. The slit width, or line width where a slit is not used, determines the spectral resolution. The spectral optics of this embodiment are very similar to those discussed above with respect to FIG. 4, and thus will not be separately discussed.

Various features of the invention are set forth in the following claims.

We claim:

1. An image processing apparatus for use with a printed image on a moving substrate, the image processing apparatus comprising:
    a first imaging device configured to process spatial data which indicates a position of the printed image on the moving substrate;
    a second imaging device configured to process densitometric data and colorimetric data of the printed image; and
    a processor configured to monitor a color of the printed image on the moving substrate based on the spatial data and at least one of the densitometric data and the colorimetric data.

2. The image processing apparatus of claim 1, wherein the processor is configured to locate a colorbar having multiple color patches in the printed image using the spatial data, wherein the monitored color is a color on the colorbar and the position is a position of the colorbar.

3. The image processing apparatus of claim 1, wherein the processor is configured to monitor the color based on the densitometric data.

4. The image processing apparatus of claim 3, wherein the processor is configured to generate color control signals based on the densitometric data.

5. The image processing apparatus of claim 1, wherein the processor is configured to monitor the color based on the colorimetric data.

6. The image processing apparatus of claim 5, wherein the processor is configured to generate color control signals based on the densitometric data.

7. The image processing apparatus of claim 1, wherein the second imaging device comprises a colorimetric filter.

8. A method for monitoring the color of a printed image on a moving substrate, the method comprising:
    processing spatial data which indicates a position of the printed image on the moving substrate;

processing a densitometric data and a colorimetric data of the printed image;

wherein the spatial data is processed at a first imaging device and the densitometric data and the colorimetric data are processed at a second imaging device; and monitoring a color of the printed image on the moving substrate based on the spatial data and at least one of the densitometric data and the colorimetric data.

9. The method of claim 8, further comprising locating a colorbar having multiple color patches in the printed image using the spatial data and wherein the monitored color is a color on the colorbar and the position is a position of the colorbar.

10. The method of claim 8, wherein the monitoring the color of the printed image on the moving substrate is based on the densitometric data.

11. The method of claim 10, further comprising controlling the color based on the densitometric data.

12. The method of claim 8, wherein the monitoring the color of the printed image on the moving substrate is based on the colorimetric data.

13. The method of claim 12, further comprising controlling the color based on the densitometric.

* * * * *

UNITED STATES PATENT AND TRADEMARK OFFICE
CERTIFICATE OF CORRECTION

| | | |
|---|---|---|
| PATENT NO. | : 7,627,141 B2 | Page 1 of 1 |
| APPLICATION NO. | : 10/424230 | |
| DATED | : December 1, 2009 | |
| INVENTOR(S) | : Patrick J. Noffke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,627,141 B2 | Page 1 of 1 |
| APPLICATION NO. | : 10/424230 | |
| DATED | : December 1, 2009 | |
| INVENTOR(S) | : Patrick James Noffke, Patrick Younk and Bradly S. Moersfelder | |

It is certified that error appears in the above-identified patent and that said Letters Patent is hereby corrected as shown below:

IN THE CLAIMS

The exact claim and line number where the errors in the issued patent are shown correctly in the application file are:

Claim 13, col. 12, line 11: following "densitometric" add -- data --

Signed and Sealed this

Fifteenth Day of February, 2011

David J. Kappos
*Director of the United States Patent and Trademark Office*